(12) United States Patent
Dominguez

(10) Patent No.: US 12,071,581 B1
(45) Date of Patent: Aug. 27, 2024

(54) FIREPROOF COMPOSITION AND RELATED PROCESSES

(71) Applicant: FireGuardia, LLC, Midland, NC (US)

(72) Inventor: Oscar Alberto Dominguez, Quetzaltenango (GT)

(73) Assignee: Fireguardia

( * ) Notice: Subject to any disclaimer, the term of this patent is extended or adjusted under 35 U.S.C. 154(b) by 0 days.

(21) Appl. No.: 18/457,534

(22) Filed: Aug. 29, 2023

(51) Int. Cl.
| | |
|---|---|
| *C09K 21/14* | (2006.01) |
| *C08K 3/26* | (2006.01) |
| *C08L 3/12* | (2006.01) |
| *C08L 89/06* | (2006.01) |
| *C09D 5/18* | (2006.01) |
| *C09D 7/40* | (2018.01) |
| *C09D 7/61* | (2018.01) |
| *C09D 7/65* | (2018.01) |
| *C09D 103/12* | (2006.01) |
| *C09D 189/06* | (2006.01) |
| *C09K 21/02* | (2006.01) |

(52) U.S. Cl.
CPC ............... *C09K 21/14* (2013.01); *C08K 3/26* (2013.01); *C08L 3/12* (2013.01); *C08L 89/06* (2013.01); *C09D 5/185* (2013.01); *C09D 7/61* (2018.01); *C09D 7/65* (2018.01); *C09D 7/70* (2018.01); *C09D 103/12* (2013.01); *C09D 189/06* (2013.01); *C09K 21/02* (2013.01); *C08K 2003/262* (2013.01); *C08L 2201/02* (2013.01); *C08L 2205/03* (2013.01); *C08L 2205/16* (2013.01)

(58) Field of Classification Search
CPC .......... C09K 21/14; C09K 21/02; C09D 7/65; C09D 7/61; C09D 7/70; C09D 5/185; C09D 103/12; C09D 189/06; C08K 3/26; C08K 2003/262; C08L 89/06; C08L 2201/02; C08L 2205/03; C08L 2205/16
USPC ....................................................... 428/221
See application file for complete search history.

(56) References Cited

FOREIGN PATENT DOCUMENTS

| | | | |
|---|---|---|---|
| CN | 106283661 | * | 1/2017 |
| CN | 109024061 | * | 12/2018 |
| KR | 201900778891 | * | 7/2019 |

* cited by examiner

*Primary Examiner* — Camie S Thompson
(74) *Attorney, Agent, or Firm* — Donald C. Kolasch; Cy Bates

(57) ABSTRACT

The subject matter of the present invention comprises a non-toxic, eco-friendly fireproof composition made substantially of all naturally occurring materials. The instant fireproof composition is inclusive of any vegetal biomass and is specifically applicable in the manufacturing of a non-toxic, fireproof wood, non-toxic, fireproof textile fabrics, and intumescent fireproof coating composition, for fire protection applicable to both residential and industrial construction, as well as numerous consumer related products, materials, and devices. The extensive use of the instant fireproof composition provides a solution to the public health concerns accompanying the use of present-day, extremely dangerous, cancer-causing fire retardants.

14 Claims, No Drawings

FIREPROOF COMPOSITION AND RELATED PROCESSES

BACKGROUND

Field of the Invention

The present invention relates to smart, non-toxic fireproof protection for both consumer and industrial applications. The fireproof materials herein and application thereof have received UL classification, meeting the rigorous standards set by the Underwriters Laboratories (UL).

Description of the Related Art

Present-day fire retardants are filled with extremely toxic, cancer-causing chemicals that cause neurotoxicity, cytotoxicity, and immunotoxicity. Current fire retardant fabrics fail at alarming rates and, because of the current chemical-laced fabrics, firefighters, for example, are steadily dying. They are 9% more likely to contract cancer and 14% more likely to die of cancer than the general public. Home structure fires are responsible for the largest number of fire-related deaths in the world. In the United States alone an estimated 40 thousand lives are lost annually, and property losses exceed 147 billion dollars. Wood, being one of the primary components in residential home construction, is a dangerous source of the extremely toxic materials present in today's fire retardants. Many other flammable materials, such as textile products, and numerous other consumer-related materials, products, and goods are also a serious public health concern as a result of the use of present-day fire retardants.

The fireproof compositions of the instant invention effectively provide for both consumer and industrial applications, while prioritizing public safety, personal health and wellness, sustainability, and environmental preservation. The fireproof composition provides a fire suppression formula implementing MEMS technology, and artificial intelligence/machine learning (AI/ML) integration and is inclusive of sustainably sourced materials. The fireproof composition provides the answer to the use of present-day ineffective, toxic fire retardants without damaging health, causing pollution of the environment, or creating toxic waste.

SUMMARY

The subject matter of the present invention comprises a non-toxic, fireproof composition that provides a solution to public health concerns relating to the use of present-day toxic fire retardant materials in the manufacturing of numerous consumer-related and industrial products, inclusive of construction building materials, such as wood and products made from wood, drywall, Styrofoam, etc., and many consumer related products, materials and goods, such as highly inflammable textile products. The instant invention comprises not only a non-toxic, fireproof composition but is further inclusive of applications and/or processes of utilizing the fireproof, non-toxic composition in the manufacturing of non-toxic, fireproof wood, fireproof textiles, and a non-toxic, fireproof coating composition.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

General Description of Embodiments

In one embodiment, a non-toxic, fireproof composition is disclosed which comprises a naturally occurring vegetal biomass.

In some embodiments, the vegetal biomass may comprise a mixture of naturally occurring vegetal sources of cellulose.

In some embodiments, the vegetal sources of cellulose may be selected from at least one member of the group consisting of corn stalk, wheat stalk, indigenous plants, wheat flour, corn flour, recycled paper, wood by-products, amylopectin, amylose, collagen-keratin-elastin and mixtures thereof.

In another embodiment, a non-toxic, fireproof composition is disclosed. The composition comprises amylopectin, amylose, collagen-keratin-elastin, and sodium bicarbonate.

In one aspect, a process in the production of a non-toxic, fireproof wood is disclosed. The process comprises the delignification of any suitable vegetal biomass, chopping the remaining stalks of said biomass thereby producing fibers of a predetermined length, mixing said resulting fibers with recycled paper into a homogeneous mixture, adding sodium bicarbonate and a gluing component to said mixture and applying pressure for a specified amount of time, at a specified temperature to produce said fireproof wood.

In some aspects, said gluing component may be prepared from any suitable plant or animal tissue.

In some aspects, said vegetal biomass may comprise a mixture of components selected from at least one member of the group consisting of corn stalk, wheat stalk, indigenous plants, wheat flour, corn flour, recycled paper, and wood by-products.

In some aspects, said vegetal biomass may comprise amylopectin, amylose, collagen-keratin-elastin, and sodium bicarbonate.

In another aspect, a process in the production of a non-toxic, fireproof textile fabric is disclosed. The process comprises impregnating any suitable naturally occurring fiber in a submersion bath containing the fireproof composition of claim 1, drying said impregnated fibers and transforming the fibers to thread by spinning and plying the fibers to produce yarn utilized to fabricate the final fireproof textile fabric.

In some aspects, said naturally occurring fiber may be selected from at least one member of the group consisting of wool, cotton, hemp, and nettle.

In some aspects, said fireproof composition comprises amylopectin, amylose, collagen-keratin-elastin, and sodium bicarbonate.

In another aspect, a process in the production of a non-toxic, fireproof intumescent coating composition is disclosed. The process comprises mixing recycled paper with plaster of Paris and a vegetal composite in the presence of a gluing agent.

In some aspects, said vegetal composite may comprise wheat flour and/or corn flour, corn starch, and sodium bicarbonate.

In some aspects, said vegetal composite may comprise amylopectin, amylose, collagen-keratin-elastin, and sodium bicarbonate.

In another embodiment, a non-toxic, fireproof intumescent coating composition is disclosed. The composition comprises amylopectin, amylose, collagen-keratin-elastin, and sodium bicarbonate.

In another embodiment, a non-toxic, fireproof wood produced according to the process of claim 5 is disclosed.

In another embodiment, a non-toxic, fireproof textile fabric produced according to the process of claim 9 is disclosed.

In another embodiment, a non-toxic, fireproof intumescent coating composition produced according to the process of claim 12 is disclosed.

The subject matter of the present invention relates to a non-toxic, fireproof composition and processes related thereto in the utilization thereof. The instant non-toxic, fireproof composition comprises conventional, naturally occurring resources of cellulose cell-containing materials, inclusive of any vegetal biomass, such as corn stalk, wheat stalk, indigenous plants, such as the Jaboncillo plant, Pega Pega plant and Canchuca plant, wheat flour, corn flour, corn starch, lawn grass, recycled paper, sugar cane, and wood by-products, such as sawdust and tree branches, amylopectin, amylose, and collagen-keratin-elastin, to name of few.

In the utilization of specifically selected members of this vegetal biomass family, the resulting non-toxic, fireproof composition is processed to produce a non-toxic, fireproof wood composite, under controlled conditions, based on the final consistency or hardness required of the wood produced and fireproof textile products. In still a further application of the fireproof, non-toxic composition, there is produced a non-toxic, fireproof coating composition.

In accordance with the process in the production of the non-toxic, fireproof wood product, delignification is utilized comprising boiling any suitable vegetal biomass material, such as corn and wheat stalks, in an alkaline solution for about 1½ to 4 hours depending upon the specific pH of the alkaline solution. For example, if the pH is 9, the boiling time will be approximately 4 hours. If the pH is 10, the boiling time will be approximately 2½ hours, or if pH is 11, the boiling time will be about 1½ hours, to achieve the desired results, that being the strength and consistency or hardness, of the wood being produced. The boiling of the solution is for the purpose of separating the lignin from the cellulose cells of the biomass. The lignin is next drained from the resulting mass and the remaining components are washed with water. The remaining stalks of the washed biomass are then chopped into fibers at a desired length of from about 1 to 2 inches. The length of the fibers determines the desired longitudinal strength and consistency, or hardness of the wood being constructed. The resulting delignified and chopped stalks are then mixed with pieces of recycled paper into a homogeneous paste and centrifuged to eliminate any excess water. The resulting paste is mixed with glue prepared from any suitable plant or animal tissue, such as corn or wheat flour glue, and sodium bicarbonate to produce the final desired consistency. The minimum amount of sodium bicarbonate required will be approximately 5% by weight of the final wood produced. The amount of the glue component being used will also be about 5% by weight of the final product, depending on the particular glue being used. If corn and/or wheat stalks are not used, alternatively any other suitable source of cellulose would suffice, such as for example lawn grass, cut to a standard length of about 2 inches.

Following the alkaline process to remove the lignin, the resulting blend is reduced to a pulp or paste and the paste mix is placed in a mold heated to a temperature of from about 200 to 400 degrees Centigrade for a period of from about 30 to 60 minutes, under a pressure of about 12 tons, the time and temperature determining the consistency/hardness of the final non-toxic, flameproof wood produced. The density and ultimate fire resistance of the final wood product will also vary according to the pressure applied and the curing time. A higher density enhances the degree of resistance to fire and/or heat.

The fireproof composition of the present invention is also utilized in the production of non-toxic, fireproof textile products. In accordance with the process of producing fireproof textile products, any suitable naturally occurring fiber can be used. In the case of the instant example, the naturally occurring fiber utilized is raw-washed wool, starting in a dry state. The wool is impregnated in a submersion water bath, at about 80 degrees Celsius, containing the fireproof composition, in this case, 20% amylopectin, 20% amylose, 19% collagen-keratin-elastin, and 1% sodium bicarbonate. The percentage of the fireproof composition is determined by what is required by the specific fiber being treated. Following impregnation, the wool is left to dry and then subjected to a carding process. This step keeps the fibers separated and aligned. Once dried, the wool fibers are subjected to a coloring bath of choice, which is followed by a sealing process in a bath at about 80 degrees Celsius. After the sealing is complete the wool is left to dry, hanging under tension. The time of residence of the fibers in the impregnation bath is dictated by the fiber in use. The tension is applied in order to keep the fibers parallel and manageable. The fibers are subjected to a weight of between about 20 to 80 times their dry weight. An additional carding step may be necessary when it comes to transforming the fibers into thread. Threading is accomplished by spinning and plying the fibers to produce the yarn from which the fabric is made. Once the desired texture and thickness of the thread are satisfactory, comes the looming step to achieve the desired pliability and strength of the fabric produced. The fabric is then fabricated into the textile of choice such as clothing for the protection of firefighters, utility workers, military personnel, oil rig crews, race car teams, everyday consumer clothing, etc., providing a safe and effective shield against both heat and flames, without carcinogenic effects. While wool is the fiber utilized to explain the process, many other naturally occurring fibers can be processed in accordance with the above procedure, such as hemp, cotton, nettle, etc. depending on the type of fabric desired.

In still a further application of the non-toxic, fireproof composition of the present invention there is produced a non-toxic, fireproof intumescent coating comprising, for example, a mixture of recycled paper, plaster of Paris, wheat flour and/or corn flour, corn starch, and sodium bicarbonate. The corn starch is mixed at a ratio of from about 50-50 parts with the wheat flour and/or corn flour. The sodium bicarbonate is added in an amount of about 10% by weight of the resulting mixture, followed by the addition of any conventional gluing agent, such as wheat flour or corn starch glue, and plaster of Paris, at approximately 30% by weight and 15% by weight, respectively, of the mixture. Food coloring concentrates can be added to the homogeneous mix if desired. Furthermore, depending on the application of the coating, the composition can contain as much as 60% to 80% of recycled paper as well as any number of other various combinations of the indigenous materials disclosed herein.

The resulting coating produced can be applied to any one of many varied surfaces, such as clothing made of textiles, for the protection of firefighters, utility workers, military personnel, oil rig crews, race car teams, everyday consumer clothing, etc., providing a safe and effective shield against both heat and flames, without carcinogenic effects. The coated fabric has a heat transfer level three times better than any existing heat-resistant synthetic fiber. The degree of protection from the flames by the coating compound is directly related to the thickness of the coating.

Other surfaces to which the intumescent coating can be applied and provide fire protection include residential and industrial construction materials, such as steel, wood, and concrete. In the event of a fire, the intumescent coating expands and forms a protective insulating barrier in response to exposure to high temperatures, delaying the spread of flames, heat transfer, and the onset of fire damage. The intumescent coating provides long-lasting fire protection, and is resistant to environmental factors, such as moisture, UV radiation, and corrosion, thereby maintaining its overall effectiveness over extended periods of time. The resulting coating is smooth and easily applied, with a visually appealing finish, seamlessly blending with the architectural design of the protected structure. The intumescent coating withstands temperatures as high as 3,600 degrees Fahrenheit.

The inventions of the instant patent application offer a comprehensive suite of smart, non-toxic fireproof protection for both consumer and industrial applications. Recycled materials, naturally occurring in nature, are utilized accordingly, mitigating carbon emissions, and providing a safer, overall environment for active and passive fire protection. The fireproof products do not emit toxic vapors or fumes when burning and thus do not support nor propagate the flames. The fireproof products are virtually smoke-free, producing 99% less smoke, whether it is the fireproof wood, fireproof textile fabric, or fireproof coating composition, withstanding temperatures in excess of 3,600 degrees Fahrenheit, providing for an eco-friendly environment, eliminating, once and for all, the ineffective and toxic fire retardants presently used.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A non-toxic, fireproof composition comprising amylopectin, amylose, collagen-keratin-elastin, and sodium bicarbonate.

2. A process in the production of a non-toxic, fireproof wood which comprises the delignification of any suitable vegetal biomass, chopping the remaining stalks of said biomass thereby producing fibers of a predetermined length, mixing said resulting fibers with recycled paper into a homogeneous mixture, adding sodium bicarbonate and a gluing component to said mixture and applying pressure for a specified amount of time, at a specified temperature to produce said fireproof wood.

3. The process of claim 2, wherein said gluing component is prepared from any suitable plant or animal tissue.

4. The process of claim 2, wherein said vegetal biomass comprises a mixture of components selected from at least one member of the group consisting of corn stalk, wheat stalk, indigenous plants, wheat flour, corn flour, recycled paper, and wood by-products.

5. The process of claim 2, wherein said vegetal biomass comprises amylopectin, amylose, collagen-keratin-elastin, and sodium bicarbonate.

6. A non-toxic, fireproof wood produced according to the process of claim 2.

7. A non-toxic, fireproof intumescent coating composition comprising amylopectin, amylose, collagen-keratin-elastin, and sodium bicarbonate.

8. A process in the production of a non-toxic, fireproof textile fabric comprising impregnating any suitable naturally occurring fiber in a submersion bath containing a non-toxic, fireproof composition comprising a naturally occurring vegetal biomass, drying said impregnated fibers and transforming the fibers to thread by spinning and plying the fibers to produce yarn utilized to fabricate the final fireproof textile fabric.

9. The process of claim 8, wherein said naturally occurring fiber is selected from at least one member of the group consisting of wool, cotton, hemp, and nettle.

10. The process of claim 8, wherein said fireproof composition further comprises amylopectin, amylose, collagen-keratin-elastin, and sodium bicarbonate.

11. A process in the production of a non-toxic, fireproof intumescent coating composition comprising mixing recycled paper with plaster of Paris and a vegetal composite in the presence of a gluing agent, wherein said vegetal composite comprises wheat flour and/or corn flour, corn starch, and sodium bicarbonate.

12. A process in the production of a non-toxic, fireproof intumescent coating composition comprising mixing recycled paper with plaster of Paris and a vegetal composite in the presence of a gluing agent, wherein said vegetal composite comprises amylopectin, amylose, collagen-keratin-elastin and sodium bicarbonate.

13. A non-toxic, fireproof textile fabric produced by impregnating any suitable naturally occurring fiber in a submersion bath containing a non-toxic, fireproof composition comprising a naturally occurring vegetal biomass including amylopectin, amylose, collagen-keratin-elastin, and sodium bicarbonate.

14. The non-toxic, fireproof textile fabric of claim 13, wherein said naturally occurring fiber is selected from at least one member of the group consisting of wool, cotton, hemp, and nettle.

* * * * *